United States Patent [19]
Vo et al.

[11] Patent Number: 5,806,000
[45] Date of Patent: Sep. 8, 1998

[54] SYSTEM AND METHOD FOR IMPLEMENTING SHORT MESSAGE SERVICE EXTENSION PHONES WITHIN A RADIO TELECOMMUNICATIONS NETWORK

[75] Inventors: Kim Vo, Montreal; Wayne S. Tom, St-Laurent, both of Canada

[73] Assignee: Telefonaktiebolaget LM Ericsson (publ), Stockholm, Sweden

[21] Appl. No.: 542,307

[22] Filed: Oct. 12, 1995

[51] Int. Cl.$^6$ ..................................................... H04Q 7/20
[52] U.S. Cl. .......................... 455/466; 455/462; 455/455; 455/518; 455/517
[58] Field of Search .................................. 455/466, 445, 455/414, 422, 433, 435, 518, 517, 521, 459, 462, 463

[56] References Cited

U.S. PATENT DOCUMENTS

| | | | |
|---|---|---|---|
| 4,890,315 | 12/1989 | Bendixen et al. | 379/59 |
| 5,309,501 | 5/1994 | Kozik et al. | 455/433 |
| 5,351,235 | 9/1994 | Lahtinen | 370/58.1 |
| 5,400,900 | 3/1995 | Salin | 455/433 |
| 5,493,694 | 2/1996 | Vlcek et al. | 455/521 |
| 5,577,103 | 11/1996 | Foti | 455/435 |
| 5,666,107 | 9/1997 | Lockhart et al. | 455/433 |

FOREIGN PATENT DOCUMENTS

| | | |
|---|---|---|
| 0 441 370 A2 | 2/1991 | European Pat. Off. . |
| WO 94/17644 | 8/1994 | WIPO . |

*Primary Examiner*—Dwayne D. Bost
*Assistant Examiner*—Tracy M. Legree
*Attorney, Agent, or Firm*—Steven W. Smith

[57] ABSTRACT

A system and method for providing short message service point-to-point extension phone service within a radio telecommunications network. The system includes a gateway mobile switching center (G-MSC), a home location register (HLR), a plurality of mobile switching centers (MSCs), and a plurality of intelligent terminals. The intelligent terminals are assigned to a single common pilot directory number (PDN) in addition to their individual directory numbers. When a call directed to the PDN is received in the G-MSC, the G-MSC sends a routing request message to the HLR. The HLR sends a short message service (SMS) data transmission to each of the plurality of intelligent terminals assigned to the PDN notifying associated mobile subscribers of an incoming extension phone call. Mobile subscribers desiring to accept the call utilize their intelligent terminals to send a responding SMS message back to the HLR. Upon receiving a response accepting the call from one or more of the notified intelligent terminals, the HLR selectively reports the temporary location directory number (TLDN) of one responding intelligent terminal to the G-MSC. The G-MSC then routes the incoming call to the selected responding intelligent terminal.

9 Claims, 3 Drawing Sheets

SYSTEM AND METHOD FOR IMPLEMENTING SHORT MESSAGE SERVICE EXTENSION PHONES WITHIN A RADIO TELECOMMUNICATIONS NETWORK

BACKGROUND OF THE INVENTION

1. Technical Field of the Invention

This invention relates to mobile telecommunication systems having mobile subscriber extension phone service, and more particularly, to a system and method for implementing short message service extension phones within a radio telecommunications network.

2. Description of Related Art

Integrated service networks use digital signal processing to support both audio and data communication channels for transmission of information between network users. Cellular radio telecommunications networks, and more specifically, mobile telecommunication systems are becoming providers of integrated services such as voice and data message transmission. A major problem with the expansion of these integrated networks to mobile systems, is that real time interactive transmission of data messages between cellular telecommunication system subscribers is not supported, disclosed, or taught.

Cellular radio communication services in North America are defined and specified by a plurality of industry standards adopted by groups comprised of both manufacturers and operators of cellular systems. These standards include EIA-627, EIA-553, IS-136, and intersystem signaling standard IS-41 which are hereby incorporated by reference. The EIA/TIA requirements set forth in standard IS-41 provide that a call within a cellular radio system is initially routed to a particular mobile switching center (MSC) in accordance with location data identifying the called mobile station (MS).

For example, a mobile subscriber is assigned a unique telephone number recognized by both the Public Switched Telephone Network (PSTN) and the Public Land Mobile Network (PLMN). Calls to a particular mobile subscriber are routed to a gateway mobile switching center (G-MSC) which consults the subscriber's home location register (HLR) to obtain information regarding the location of the subscriber's mobile station, and other status information stored in a subscriber profile. A subscriber's mobile station transmits a unique mobile identification number (MN) which is detected and identified by MSCs, after an initial registration procedure, whenever the mobile station is activated within the service area of a receiving exchange. Actual paging of the called MS may take place in the MSC in which the MS is located before the call is routed. If the location data stored in the HLR is correct and the mobile station is currently in an active power on state, the MS responds to the page and the call is completed.

The EIA/TIA requirements set forth in standard IS-627 provide for extension phones to mobile stations within the cellular system. In such an implementation, mobile stations subscribing to extension phone service are assigned two directory numbers: an individual directory number for regular calls (i.e., non-extension phone calls), and a pilot directory number (PDN) for extension phone calls. The PDN is associated with two or more individual mobile stations, each of which has a different MIN. In order to provide extension phone service, the HLR maintains separate location information data for each of the plurality of mobile stations assigned to the same PDN. An incoming call to a PDN causes the cellular network to signal each of the associated mobile stations, establish a voice channel connection with each active MS, and selectively route the call to a single responding MS.

An example of an extension phone service is described in co-owned and co-pending U.S. patent application Ser. No. 08/411,546, filed on Mar. 28, 1995, entitled "A Method and System for Implementing Extension Phones Within a Cellular Radio Telecommunications Network", which is hereby incorporated by reference herein.

Cellular radio networks and mobile stations are now implemented with digital technology, thereby permitting the integration of data transmission services with the voice communication service of analog cellular networks. Data transmission services include short message service (SMS) signaling technology which enables short textual messages to be sent over a digital control channel to a subscriber's mobile station for display upon the mobile station's display screen. SMS signaling utilizes message storage and forwarding techniques by storing SMS messages in a message center until the mobile station is assigned a digital control channel.

Certain business applications and subscriber needs, however, indicate a growing interest in real-time interactive data transmission for a more economic use of network resources and more efficient communication between users. For example, calls to extension phones on current cellular networks require that the system open or freeze a plurality of voice channels when signaling extension phone subscribers. The voice channels are not released until one mobile station is selected for receipt of the incoming call. In addition, the current short message service signaling scheme is inadequate for signaling extension phone subscribers because its basic store and forward architecture precludes real time signaling.

Although there are no known prior art teachings of a solution to the aforementioned deficiency and shortcoming such as that disclosed herein, U.S. Pat. No. 5,351,235 to Lahtinen discusses subject matter that bears some relation to the matters discussed herein. Lahtinen '235 discloses to a method of relaying short data messages between users in an integrated services network. As disclosed in Lahtinen '235, the method teaches a short message service scheme utilizing a message switching service to enable an originating caller to send a message to a short message service center for storage and subsequent transmission to a call terminating device. Lahtinen '235, however, is limited to short message transmissions using the "store and forward" principle and fails to address a procedure by which an originating caller can cause a short message to be immediately sent to a terminating subscriber and likewise support the automatic transmission back of the terminating subscriber's real-time response.

As noted above, in existing mobile telecommunication systems, the integration of data transmission services with voice transmission services to facilitate message correspondence between users requires the originating caller to send a message to a short message service center for storage. The message is later retrieved and forwarded to the intended recipient. Use of direct, real-time short message transmission within the cellular network would be a distinct advantage in businesses requiring fast, efficient communication between subscribers, and would more quickly release valuable network resources.

Specifically, it would be advantageous to have a system and method for implementing a real-time short message service in cellular extension phone groups for a plurality of mobile stations located within single or multiple MSCs. The system and method would use a real-time short message data transmission to inform mobile station extensions of an incoming call to a pilot directory number (PDN). The system and method of the present invention provides such a solution.

SUMMARY OF THE INVENTION

In cellular radio telecommunication networks implementing extension phone services, a system and method of notifying extension phone subscribers of an incoming call is provided utilizing real-time short message data transmission.

In one aspect, the present invention is a method of providing extension phone service utilizing short message data transmissions within a mobile telecommunication system. The mobile telecommunication system includes a gateway mobile switching center (G-MSC), a home location register (HLR), and a plurality of intelligent terminals. The intelligent terminals have individual directory numbers for receiving regular calls, and are assigned to a single common pilot directory number (PDN) for receiving extension phone calls. The system may also include a plurality of visited mobile switching centers (V-MSCs) each of which includes a MSC and a visitor location register (VLR). Each intelligent terminal is an integrated service unit having the capabilities of a mobile station and a bi-directional data messaging device in a single terminal unit.

In another aspect of the method of the present invention, an incoming call is received in the G-MSC which, in turn, sends a location request message to the HLR. The HLR determines whether the call is to a common PDN and causes a short data message to be transmitted to each one of the plurality of intelligent terminals identified as associated with the PDN. Upon receiving a return data message from at least one of the plurality of intelligent terminals, the HLR selects a responding terminal and sends a temporary location directory number (TLDN) associated with the terminal to the G-MSC for routing of the call to the selected subscriber terminal.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention implements short message service extension phones within a mobile telephony system whereby a data message is sent to a plurality of intelligent terminal mobile stations informing the mobile subscribers of an incoming call to a single pilot directory number (PDN). Alerted subscribers optionally send a control message to the interrogating exchange to indicate call acceptance before the call is routed to one of the responding terminals. The figures of the drawings illustrate the present invention using IS-41 and IS-627 intersystem specification communication and extension phone protocols which are hereby incorporated by reference. However, other suitable communication protocols and extension phone systems may be utilized without departing from the scope of the present invention.

Figure 1:
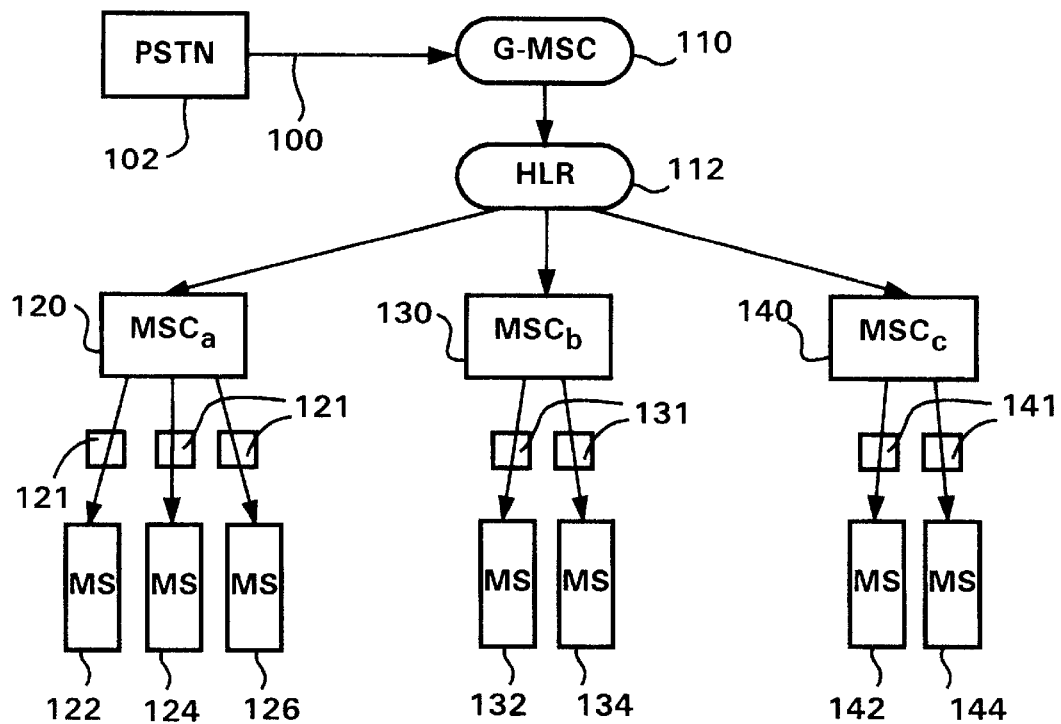
FIG. 1 (Prior Art) is a simplified block diagram of a standard cellular radio communication system supporting extension phone groups.

Referring to FIG. 1, a simplified block diagram of a conventional cellular radio communications system providing extension phone service is illustrated. Generally, an incoming call 100 from a public switched telephone network (PSTN) 102 directed to a PDN is routed to a gateway mobile switching center (G-MSC) 110. The G-MSC 110 consults a home location register (HLR) 112 to obtain information identifying the MSCs serving the present location of the mobile stations associated with the PDN. For purposes of illustration, and not by way of limitation, FIG. 1 shows MSCa 120, MSCb 130, and MSCc 140 along with base stations 121, 131 and 141. Mobile stations 122, 124, and 126 are in the coverage area of MSCa. Mobile stations 132 and 134 are in the coverage area of MSCb, while mobile stations 142 and 144 are in the coverage area of MSCc. The HLR maintains location data independently for each mobile station within the group of mobile stations assigned to the same PDN. Upon receipt of call 100 directed to that PDN, the G-MSC 110 requests the MSCs 120, 130, and 140 to page each mobile station 122, 124, 126, 132, 134, 142, and 144 in accordance with each mobile station's MIN. The MSCs 120, 130, 140 then page the relevant mobile stations through base stations 121, 131 and 141, in a quasi-simultaneous fashion regardless of their proximity to or separation from one another.

It will be understood and appreciated by one skilled in the art that G-MSC 110, HLR 112, and MSCs 120, 130, 140 may be logically separate from each other or may physically be within the same entity. Similarly, since each mobile station being paged is identified by a separate MIN, all mobile stations associated with the PDN may be located in different MSCs and independently paged from the MSCs through separate base stations, as shown herein, or alternatively, the MS group may be located within the same MSC and be simultaneously paged therein.

IS-41C includes a description of an extension phone process referred to as "Flexible Alerting". In Flexible Alerting, each serving MSC that receives a page response from a paged mobile station returns the responding mobile station's temporary location directory number (TLDN) to the originating MSC. The originating MSC then completes call setup to each TLDN received. When one of the mobile stations answers, the originating MSC releases the calls to the other TLDNs.

In co-owned and co-pending U.S. patent application Ser. No. 08/411,546, filed on Mar. 28, 1995, entitled "A Method and System for Implementing Extension Phones Within a Cellular Radio Telecommunications Network", an improved method of providing extension phone service is disclosed. After execution of the page attempts, the MSCs 120, 130, and 140 report any non-responsive mobile stations, for example, mobile stations 122, 132, 134, and 144, to the HLR 112, which immediately stops the call setup process for the non-responsive stations. Next, the MSCs 120 and 140 that received a page response establish a radio voice channel connection with the responding mobile stations 124, 126, and 142 and alert their respective subscribers of an incoming PDN call. Each responding mobile subscriber that answers the alert is temporarily put on hold. The MSCs 120 and 140 then report to the HLR 112 any mobile stations that did not answer or that returned a busy signal. The HLR immediately stops the call setup process for these unanswering or busy mobile stations. During the time period that the answering subscribers are on hold, their associated MSC reports their routing number to the HLR 112. After a predetermined period of time, the HLR 112 selects one of the reported routing numbers for routing the call according to a predetermined criterion which may be, for example, the first to answer. Once the routing number has been selected, the HLR 112 releases all other non-selected answering mobile subscribers from hold. The HLR 112 then returns the routing number to the G-MSC 110 so that the call can be routed to the MSC of the selected number.

Figure 2:
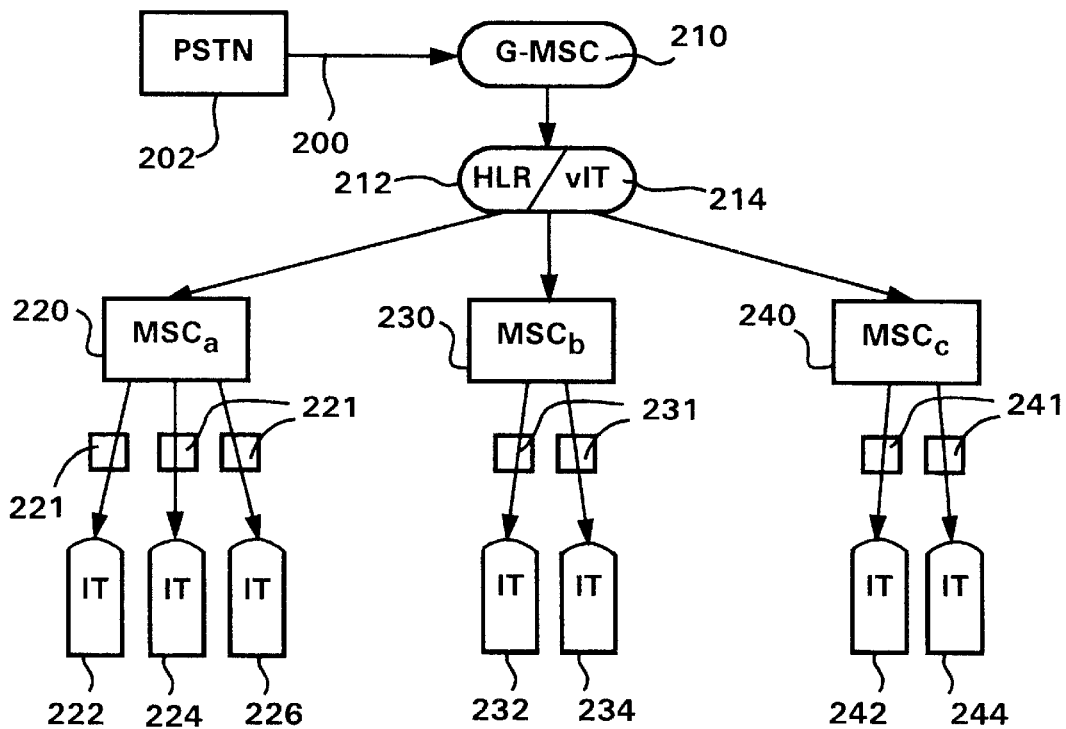
FIG. 2 is a simplified block diagram of a cellular radio communication system supporting short message service extension phone groups in accordance with the teachings of the present invention.

Referring now to FIG. 2, a simplified block diagram of a cellular radio telecommunication system supporting short message service extension phone groups in accordance with the teachings of the present invention is shown. As shown in FIG. 2, the system of the invention includes G-MSC 210, HLR 212, virtual intelligent terminal (vIT) 214, MSCs 220, 230, and 240, base stations 221, 231 and 241, and a plurality of associated mobile station intelligent terminals (ITs) 222, 224, 226, 232, 234, 242 and 244. The ITs used in the system and method of the present invention are integrated digital terminals which include standard mobile station technology and remote digital display paging technology in the same unit. Each IT is assigned a unique mobile identification number (MIN). Similarly, the HLR of the present invention includes digital technology to support digital data transmission signals from the virtual IT 214 to the remotely located ITs.

In the present invention, when the G-MSC 210 consults the HLR 212 after receiving incoming call 200 from, for example, the PSTN 202, the HLR sends the PDN to the vIT 214. The vIT 214 section of the HLR has access to subscriber information regarding the probable location of the ITs associated with the incoming PDN call 200. The vIT 214 then queries the related MSCs 220, 230, 240 for IT location information. After learning the location of the ITs 222, 224, 226, 232, 234, and 242, the vIT 214 outputs short data messages to the ITs informing the subscribers of an incoming call to the PDN. Although, the vIT 214 short data messages are transmitted through the MSCs 220, 230 and 240, and base stations 221, 231 and 241, the SMS communications are essentially transparent to the MSC switching nodes. If available, the subscriber elects whether to send a response signal back to the vIT 214 indicating readiness to accept the call 200. The vIT 214 next passes the terminal identification numbers of the responding ITs back to the HLR 212. If more than one response is received, the HLR 212 selects one of the responding ITs utilizing predefined selection criteria, and returns the TLDN of the selected IT to the G-MSC 210 for delivery of the call using normal call setup procedures.

As illustrated in FIG. 2, the system and method of the present invention provide a cellular extension phone service utilizing short message service point-to-point (SMS-PP) data transmission during IT identification and selection. As used herein, SMS-PP messages are real-time data messages digitally transmitted from the originating source to the destination terminal, and vice versa, within a cellular network without being sent to an intervening short message service center for storage and forwarding. The SMS-PP messages are "real time" in the sense that they are transmitted through the telecommunications network essentially without delay utilizing non-store-and-forward techniques. If a particular destination terminal is, for example turned off, in a sleep mode, or not operating on a digital control channel at the time the data message is sent to the extension phone group, the data message directed to that terminal is lost.

In the instant case, the originating source is the vIT 214 and the destination terminals are ITs 222, 224, 226, 232, 234, 242, and 244. This direct transmission of SMS-PP messages does not needlessly occupy valuable system resources by establishing and holding voice channels open for each responding MS until the selected MS is identified and the duplicative resources are released. In addition, transmission of short messages directly to the ITs (bypassing switching centers) can inform the subscriber of an incoming PDN call even if the IT is engaged in another terminal function such as a previously completed voice call.

Figure 3:
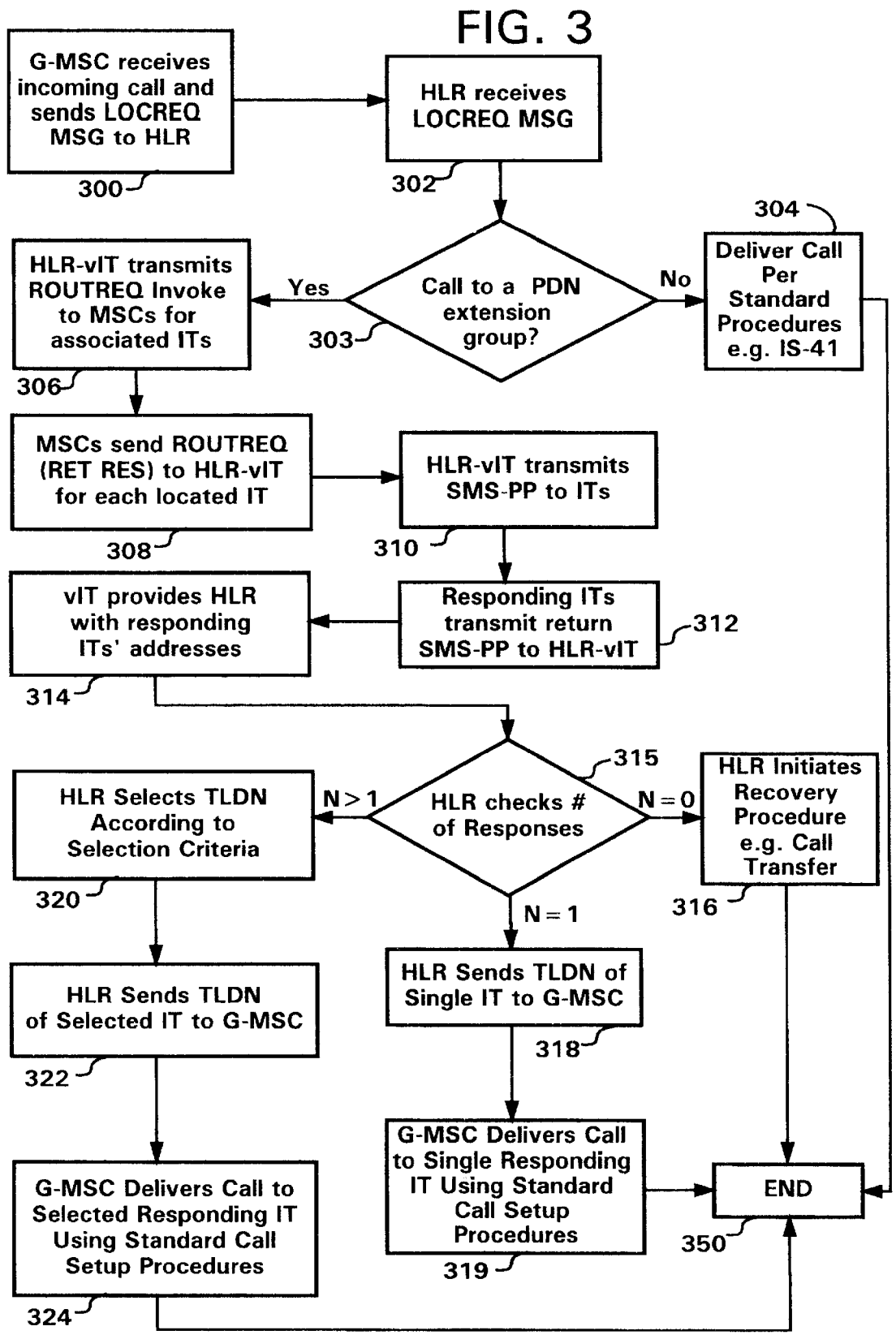
FIG. 3 is a flow chart detailing the procedures for notifying a mobile station within a cellular radio telecommunication system of an incoming extension phone call and routing the call to a responding mobile station in accordance with the teachings of the present invention.

Referring next to the flow chart shown in FIG. 3, there is illustrated a procedure by which short message service extension phones within a cellular radio system may be implemented in accordance with the teachings of the present invention. At step 300, the G-MSC receives an incoming call to a subscriber directory number and sends a location request (LOCREQ) invoke message to the HLR. At step 302, the ILR receives the LOCREQ message and proceeds to determine whether or not the incoming call is to an individual directory number or a PDN having a group of mobile stations assigned. This is accomplished in step 303 by determining whether the directory number maps to a list of mobile stations associated with the HLR. The list may include a plurality of mobile identification numbers (MINs). If the HLR determines that the directory number is associated with only a single MIN, the system moves to step 304 where the call is delivered to the mobile station or intelligent terminal having the assigned MIN in accordance with standard call setup procedures and ends with step 350. If the HLR determines, however, that the directory number is associated with multiple MINs, the system recognizes that the call is for a PDN extension phone group and proceeds to step 306.

At step 306, the vIT of the HLR sends a routing request (ROUTREQ) invoke message for each IT to the MSCs identified in the HLR database as being the current location of each of the corresponding ITs. After the relevant MSCs send a ROUTREQ return result message back to the vIT in step 308, the system proceeds to step 310 where the vIT transmits real-time short message service point-to-point (SMS-PP) data messages to each located IT. If a subscriber utilizing one of the contacted ITs is interested in accepting the PDN call, the subscriber sends a return signal or SMS-PP response to the vIT in step 312.

After a predetermined period of time, the system moves to step 314 where the vIT returns the results, including identification of the responding ITs, to the HLR. At step 315, the HLR determines the number of responding ITs. If no subscribers responded, the system proceeds with step 316, and initiates standard recovery procedures such as sending a no answer message to the originating caller, and the process ends at step 350. If one subscriber responded, the system proceeds from step 315 to step 318, where the HLR sends the TLDN of the responding IT to the G-MSC. The process then continues with step 319, where the call is delivered to the responding IT following normal call setup procedures, before ending the process at step 350.

If more than one subscriber answered, the system moves from step 315 to step 320 where the HLR selects a reported routing number according to predetermined criteria. Such criteria may include, for example, routing the call to the first answering subscriber, to the subscriber closest to the originating calling party, or to the answering subscriber having the highest priority as assigned to the subscriber ITs in the PDN subscriber profile. After the selection is completed, the system proceeds with step 322, where the HLR sends the TLDN of the selected IT to the G-MSC. The process continues with step 324 to deliver the incoming call to the selected responding IT before ending the process at step 350.

Figure 4:
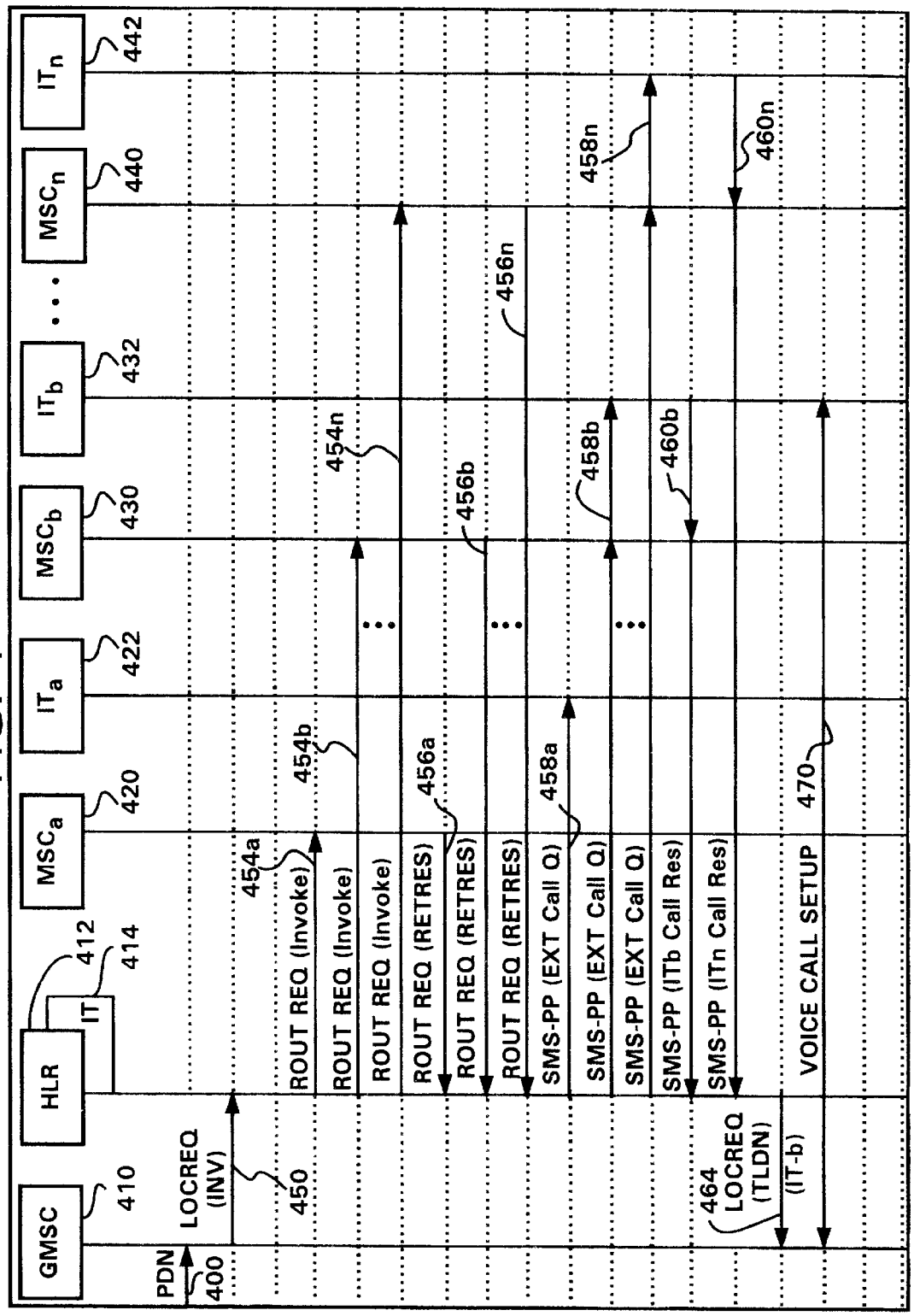
FIG. 4 is a message flow diagram illustrating the implementation of a short message extension phone service in accordance with the teachings of the present invention.

Referring now to FIG. 4, the messages sent and received during the implementation of an incoming call to a short message service extension phone in accordance with the teachings of the present invention are shown. As illustrated herein, the system of the invention includes G-MSC 410, HLR 412, vIT 414, MSCs 420, 430, and 440 and ITs 422, 432, and 442. It will be understood and appreciated by those skilled in the art that network nodes G-MSC 410, HLR 412 and MSCs 420, 430, and 440 may be logically separate from each other or may physically be within the same entity. In addition, those skilled in the art will appreciate that the actual communication along signal lines between and among the nodes may vary depending upon the design of the telecommunication system and the demands placed thereon at the time of the paging and short message transmission process.

An incoming call 400 to a PDN is routed to an interrogating system having a G-MSC 410 and an HLR 412 with virtual intelligent terminal (vIT) 414 enhancements. The G-MSC 410 determines the home location register of the called subscriber number and sends a location request (LOCREQ) invoke message 450 to the HLR 412. If an analysis of the subscriber number profile indicates that the called number is to a PDN extension phone supporting SMS-PP service, the vIT 414 signal processing unit of HLR 412 receives the information from the LOCREQ message. The MSCs 420, 430, and 440, associated with the extension phone group receive a routing request (ROUTREQ) invoke message 454 from the vIT 414 for identification of any ITs in the service area of each MSC. It will be understood and appreciated by those skilled in the art that the number and location of MSCs receiving a ROUTREQ message from vIT 414 will depend on the profile contained in the HLR for the called PDN and the reported location of the associated ITs.

If a MSC has an IT in its area associated with the PDN, the MSC notifies the HLR that the IT is in that MSC by sending a ROUTREQ return result message 456 to the vIT 414. The vIT then transmits extension call query messages to the located ITs along SMS-PP data signal lines 458a, b, n. The contacted ITs may elect to send a return signal extension call response to the inquiring IT 414 as shown by signal lines 460b and 460n. The HLR then selects an IT to receive the call (e.g., ITh) based upon the selection criteria discussed in relationship to FIG. 3. The HLR 414 then transmits a LOCREQ return result message 464 to the GMSC 410 and includes the TLDN for ITb. The standard procedures for voice call setup are then followed as indicated along signal line 470.

The present invention thus enables extension phone group subscribers to better utilize system resources within the telecommunications network. With real-time point-to-point short message services, incoming call notification to multiple subscriber stations does not require reserving voice channels before determining where the incoming call will be directed. It will be understood and appreciated by those skilled in the art having access to this disclosure, that real-time short message services may be sent from an originating point to a destination point at any time during the standard call setup procedure as long as the interrogating HLR and the destination mobile station have integrated intelligent terminal enhancements.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A mobile telecommunication extension phone system having a gateway mobile switching center (G-MSC), a home location register (HLR), and a plurality of mobile switching centers (MSCs), said system comprising:

a plurality of intelligent terminals, each one of said plurality of intelligent terminals being assigned an individual directory number for receiving individual calls and a single common pilot directory number (PDN) for receiving extension phone calls;

means for transmitting a real-time short message service (SMS) message from said HLR to each of said plurality of intelligent terminals, said SMS message identifying as an extension phone call, an incoming call in the G-MSC which is directed to the PDN;

means for receiving in the HLR, a return real-time SMS message from at least one responding terminal of said plurality of intelligent terminals, said return SMS message including an indication of the availability of the responding terminal to receive the extension phone call; and means for selectively routing the incoming call directed to said PDN to one of the available responding intelligent terminals that transmitted a return SMS message to said HLR.

2. A method of providing extension phone service within a mobile radio communication system having a gateway mobile switching center (G-MSC), a home location register (HLR), a plurality of mobile switching centers (MSCs), and a plurality of intelligent terminals, each one of said plurality of intelligent terminals being assigned an individual directory number for receiving individual calls and a single common Pilot Directory number (PDN) for receiving extension phone calls, said method comprising the steps of:

receiving a call in the G-MSC directed to said common PDN;

obtaining, by the HLR, location information for each of the plurality of intelligent terminals from the plurality of MSCs;

transmitting a real-time short message service (SMS) message from said HLR to each of said plurality of intelligent terminals;

transmitting a real-time return SMS message from at least one of said plurality of intelligent terminals to said HLR in response to said SMS message transmitted from the HLR, said return SMS message including an indication of the availability of the terminal to receive the call; and selectively routing said call to one of said available responding intelligent terminals.

3. The method of providing extension phone service within a mobile radio communication system of claim 2 wherein the step of selectively routing said call includes the steps of:

selecting, in the HLR, one of said intelligent terminal to receive said call in accordance with a set of predefined criteria; and sending the routing number of the selected terminal to the G-MSC for routing the incoming call to the selected terminal.

4. A mobile telecommunication extension phone system in a cellular network having a gateway mobile switching center (G-MSC) for receiving incoming calls directed to a common pilot directory number (PDN) and for receiving incoming calls directed to unique individual directory numbers, said system comprising:

a plurality of intelligent terminals, each intelligent terminal including:
mobile phone means; and
means for transmitting and receiving real-time shot message service (SMS) messages; and
a home location register (HLR) comprising:
a database of subscriber information, said database including:
the single common pilot directory number (PDN), said PDN being assigned to the plurality of intelligent terminals; and
a plurality of unique individual directory numbers which are individually assigned to each of the plurality of intelligent terminals;
means for obtaining a routing for each of the plurality of intelligent terminals
a data message transmission mechanism for transmitting a real-time SMS message from the HLR to each of said plurality of intelligent terminals, said SMS message identifying an incoming call as an extension phone call;
a data message receiving mechanism for receiving SMS response messages from the plurality of intelligent terminals, said SMS response messages including an indication of the availability of each terminal to receive the incoming call;
means for selecting one of the available responding terminals to receive the call; and
means for sending the routing number of the selected terminal to the G-MSC for routing the incoming call to the selected terminal.

5. The mobile telecommunication tension phone system of claim 4 wherein the means for selecting one of the available responding terminals to receive the call includes means for selecting the terminal in accordance with a set of predefined criteria.

6. The mobile telecommunication extension phone system of claim 5 wherein said means for selecting the terminal in accordance with a set of predefined criteria includes means for selecting the terminal which is the first to respond with an indication that the terminal is available to receive the call.

7. The mobile telecommunication extension phone system of claim 5 wherein said database of subscriber information includes a priority for each of the plurality of intelligent terminals, and the means for selecting the terminal in accordance with a set of predefined criteria includes means for selecting the terminal which has the highest assigned priority.

8. The mobile telecommunication extension phone system of claim 5 wherein said means for selecting the terminal in accordance with a set of predefined criteria includes means for selecting the terminal which is the closest to a defined geographic location.

9. The mobile telecommunication extension phone system of claim 8 wherein said means for selecting the terminal which is the closest to a defined geographic location includes means for selecting the terminal which is the closest to a calling party.

* * * * *